C. A. REDMOND.
SHOCK ABSORBING ATTACHMENT FOR BICYCLES.
APPLICATION FILED MAY 3, 1909.
973,071. Patented Oct. 18, 1910.
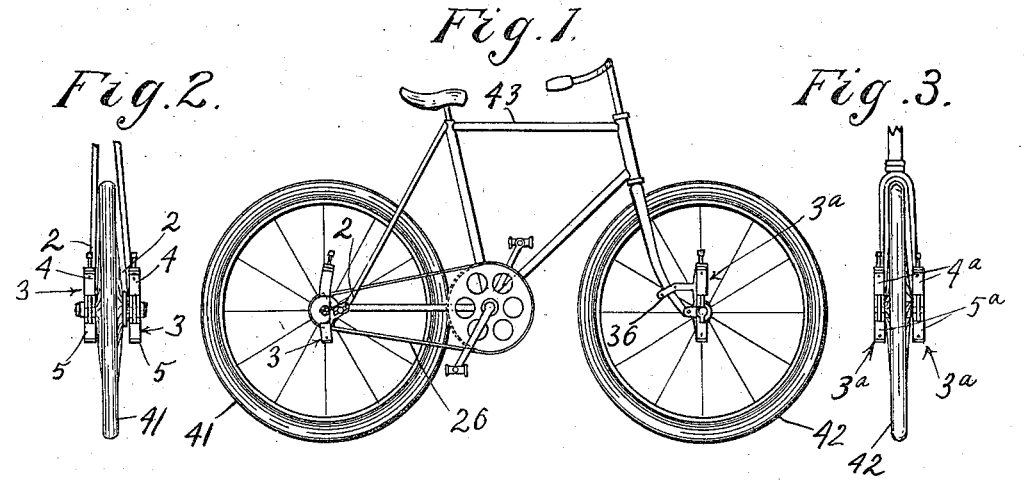
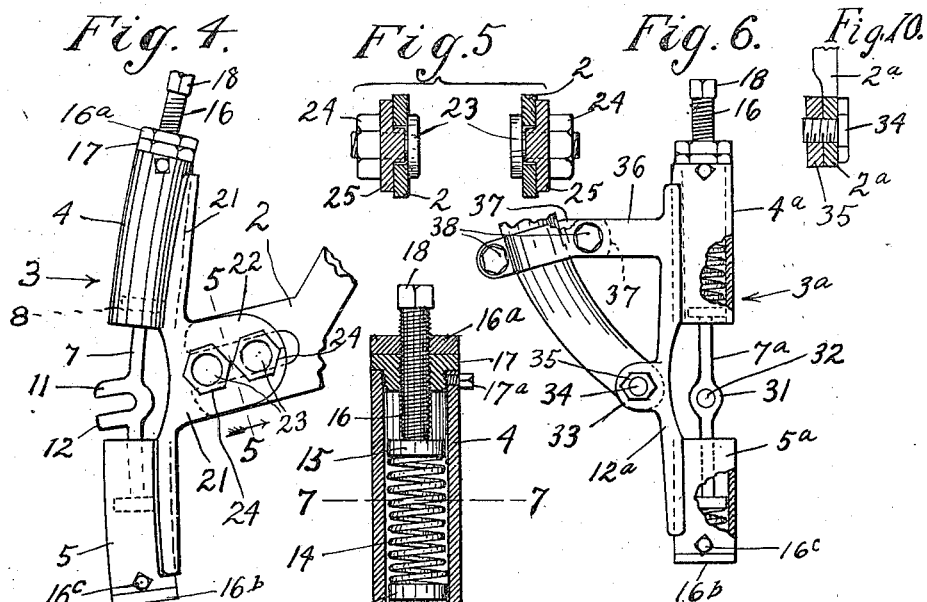
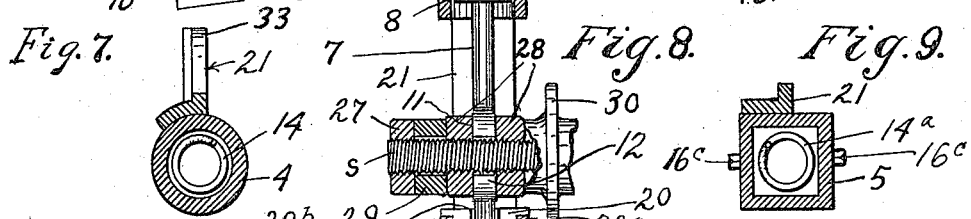
Witnesses:
H. H. Hunt.
Rebecca Rosenbaum
Inventor:
Charles A. Redmond
By Albert H. Merrill
his atty

UNITED STATES PATENT OFFICE.

CHARLES A. REDMOND, OF LOS ANGELES, CALIFORNIA.

SHOCK-ABSORBING ATTACHMENT FOR BICYCLES.

973,071.  Specification of Letters Patent.  Patented Oct. 18, 1910.

Application filed May 3, 1909. Serial No. 493,744.

*To all whom it may concern:*

Be it known that I, CHARLES A. REDMOND, a citizen of the United States, residing at Los Angeles, California, have invented a new and useful Shock-Absorbing Attachment for Bicycles, of which the following is a specification.

Objects of this invention are to provide a shock absorbing attachment for bicycles and motorcycles which may be readily attached to these vehicles to neutralize shocks between either or both wheels and the frame, in a manner not requiring any change in the construction of the vehicle itself, to provide an attachment of the character stated which is an improvement in respect to simplicity of construction, durability, and adaptability for being quickly and easily attached by unskilled persons and with the use of ordinary tools.

A further object of the invention is to provide a shock absorbing attachment adapted to be applied to the rear wheel of a bicycle or motorcycle in a manner that will not interfere with the proper action of a driving chain in propelling the vehicle.

Another object is to provide superior means for adjusting the tension of the shock absorbing springs to adapt the vehicle for riding on different roads and for the use of riders of different weights.

Other objects and advantages may hereinafter appear to persons skilled in the art to which the invention pertains.

Referring to the accompanying drawings which illustrate the invention,—Figure 1 is a side elevation of a bicycle provided with the invention applied to the rear forks and also to the front forks. Fig. 2 is an elevation of the rear end of Fig. 1 parts being broken away. Fig. 3 is an elevation of the front end of Fig. 1, the upper portion of the bicycle being broken away. Fig. 4 is an enlarged elevational detail looking toward the outer side of one of the rear forks, showing one of the shock absorbers attached thereto. Fig. 5 is a sectional detail through both of the rear forks on line 5—5 of Fig. 4. Fig. 6 is an enlarged elevational detail looking toward the outer side of one of the front forks, showing one of the shock absorbers attached thereto. Fig. 7 is a transverse section on line 7—7 of Fig. 8. Fig. 8 is a rear elevation, on a still larger scale, of Fig. 4, the casing being shown in section. Fig. 9 is a transverse section on line 9—9 of Fig. 8. Fig. 10 is an enlarged sectional detail of the means for attaching the shock absorber to one of the front forks.

The part of the appliance adapted to be attached to the rear fork of the bicycle will first be described.

Referring in detail to the drawings—each rear fork 2 has attached thereto a spring holder 3 consisting of a tubular casing having an upper section 4 which is circular in transverse section, and a lower section 5 the wall of which is square in transverse section. The sections 4 and 5 of the spring holder are mounted in approximately a vertical position being separated from each other; or in other words provided with a wide opening as shown in Fig. 4 to permit the bearing rod 7 to be inserted. Said bearing rod 7 carries at its upper end the round head 8 adapted to play within the section 4, and at its lower end the square head 9 adapted to play within the lower section 5 but being non-rotatable with respect thereto. Said rod 7 is furnished with the bracket arms 11 and 12 which straddle shaft $s$ of the rear wheel and are fitted thereto in the same manner as the rear fork of a bicycle.

Within the upper section 4 is a shock absorbing compression spring 14 which militates between the upper head 8 and an adjustable abutment desirably a head 15 carried by the lower end of a screw 16 which is supported by a cap 17 that screws into the upper end of the section 4. Said screw 16 is provided with a squared head 18 to provide for the adjustment thereof, and with a lock nut $16^a$.

The lower end of the bearing rod 7 is provided with a squared head 9 which fits within the square lower section 5 of the spring holder which contains the compression spring $14^a$ seated on the lower cap $16^b$. The upper cap 17 is engaged by set screw $17^a$, and the lower cap $16^b$ by set screws $16^c$.

The square lower section 5 of the spring holder is provided with a flanged cap 20 which closes the upper end thereof and is held in place desirably by the set screws $20^a$. Said cap has a central hole $20^b$ somewhat larger than the lower arm of the bearing member 7 to allow said member to play freely therethrough and to accommodate the slight forward and rearward movements of the member 7 owing to the curve of the spring holder 3. Said cap 20 forms an abutment for the upper end of an auxiliary compression spring 20ᶜ which acts between head 9 and said abutment to assist the upper compression spring 14 to neutralize the shock when an obstacle is encountered by the rear wheel. The spring 20ᶜ is shorter and composed of smaller, weaker coils than the upper spring 14 so that it will endure being compressed the greater portion of its length and is adapted to neutralize the recoil resulting from the compression of the two heavy springs 14 and 14ᵃ. In assembling the parts, the collar 20 is placed over the lower arm of the bearing member 7 before the head 9 is attached thereto. The springs 14 and 20ᶜ take the direct shock when an obstacle is encountered. The spring 14ᵃ beneath the lower head 9 neutralizes the rebound.

In order to attach the spring holder to the forks 2, an attaching piece 21, desirably a sheet metal strip extending from the upper to the lower end of each spring holder 3, is provided, being firmly brazed to said spring holder. Said strip is provided with a horizontal ear 22 which is clamped to and against one side of the fork 2 by means of the bolts 23, each bolt 23 having a nut 24 screwing thereonto against a washer 25 as seen in section in Fig. 5. In order that the shock absorbing movement may not interfere with the operation of the driving chain 26, the spring holder is slightly curved as seen in Figs. 1 and 4 in the form thereof which is designed to be fastened to the rear forks.

The shock absorbers 4 and 5 are each curved rearwardly and are both formed as arcs of the same circle, the driving sprocket being located at the center of said circle, so that said shock absorbers coöperate perfectly to maintain the driving chain at the proper tension at all times.

Referring to Fig. 8, the arms 11 and 12 of the bearing member 7 pass astride the threaded shaft $s$ and are held in fixed relation thereto on each side of the bicycle by the clamping nut 27. 28 are spacing nuts and 29 is a thickened washer. 30 designates the wheel hub.

The form of the appliance shown in Fig. 6 attached to the front forks is in its general construction the same as the form of the appliance designed for attachment to the rear forks, and therefore will not be described in detail except wherein it differs from the other form. Referring to Fig. 6, the sections 4ᵃ and 5ᵃ of the casing are straight instead of curved. The bearing rod 7ᵃ is provided with a swelled portion 31 wherein is an aperture 32 adapted to receive the axle of the front wheel. The attaching piece 12ᵃ which is brazed to each front spring holder 3ᵃ is provided with an apertured ear 33 through which extends a bolt 34 and nut 35 which clamp said ear 33 against and to the outer side of each front fork 2ᵃ as shown in detail in section in Fig. 10. A single bolt 34 and nut 35 are sufficient to clamp each spring holder 3ᵃ securely to each front fork, but at the rear forks two clamping bolts are preferably employed as already described. 36 is a brace, desirably formed as a rearward extension of the strip 12ᵃ and fastened to each front fork by the clamping plate 37 and bolts 38 in a well known manner.

In both forms of the attachment the spring containing sections are desirably independent tubes which are united together by the supporting part 12 or 12ᵃ one above the other so that the length of the bearing member 7 or 7ᵃ is greater than the distance between the adjacent ends of the spring containers. In the assembling of the parts, the bearing member is first inserted and the uniting part 12 or 12ᵃ brazed to the spring containers while the same are held in the proper relative position. The bearing member is thus inserted in each spring container a sufficient distance to safeguard it from accidental displacement.

When the shock absorber is applied to a bicycle or motor cycle for a heavy rider, the screw rod 16 is screwed down to compress the spring 14 the desired amount. The lower spring 14ᵃ is designed to oppose the rebound to make the vehicle ride more smoothly.

In the drawings the shock absorber is illustrated as applied to the rear wheel 41 and front wheel 42 of a bicycle, the frame being designated 43, but it is to be understood that the invention is applicable to motor cycles and also to bicycles of various designs.

I claim:

1. The combination with the frame and a wheel of the vehicle; of, an approximately vertical spring holder, means for attaching said holder to the frame, said holder having an upper and a lower section separated from each other by an opening, a bearing rod having a head at its upper end in said upper section, a closure for the upper end of said upper section, an adjusting screw extending through said closure, a head at the lower end of said screw, and a spring interposed between said heads, the lower end of said bearing rod being guided by said lower section.

2. In a device of the character described, an upright tubular spring-holder, a compression spring in said holder, a closure for the upper end of said spring-holder, an adjusting screw extending through said closure and projecting thereabove, a head at the lower end of said screw engaging said spring to regulate the compression thereon, means securing said spring holder to a vehicle, an axle, a wheel mounted thereon, and means connected to said axle and engaging the lower end of said spring to absorb shocks.

3. In combination, a vehicle frame, a spring holder having a vertical tubular portion consisting of two sections separated by an operating opening, a bearing member non-rotatably engaging one of said sections, said member being non-rotatably movable in said sections, and a shock absorbing spring in the upper section above said bearing member.

4. In combination, a vehicle frame, a spring holder having a vertical tubular portion consisting of two sections separated by an operating opening, a bearing member non-rotatably engaging one of said sections, said member being non-rotatably movable in said sections, a shock absorbing spring in the upper section above said bearing member, and vertically adjustable means against which the upper end of said spring abuts.

5. In combination, with the rear wheel, bearing forks driving sprocket and driving chain of the vehicle, of a shock absorber attached to each of said forks, means to maintain said shock absorbers in fixed relation to each other, and a bearing rod carried by and yieldingly supported in each of said shock absorbers, each of said shock absorbers being curved rearwardly to avoid interference with the operation of the driving chain, the curves of said shock absorbers both being formed as arcs of the same circle and the driving sprocket wheel being located at the center of said circle.

6. The combination, with the frame and a wheel of the vehicle, of an upright spring holder, a bearing rod having an upper and a lower head in said spring holder, a spring to act upon the upper side of the upper head, a spring to act upon the lower side of the lower head, a spring to act upon the upper side of the lower head, and means to hold said springs in place.

In testimony whereof I have hereunto signed my name in the presence of two subscribing witnesses at Los Angeles, in the county of Los Angeles and State of California, this 27th day of April 1909.

CHARLES A. REDMOND.

Witnesses:
   Isaac S. Smith,
   Albert H. Merrill.